(12) United States Patent
Farrenkopf et al.

(10) Patent No.: US 9,090,514 B2
(45) Date of Patent: Jul. 28, 2015

(54) HIGH TEMPERATURE EXPANDABLE REFRACTORY

(71) Applicant: FuelCell Energy, Inc., Danbury, CT (US)

(72) Inventors: Dennis Robert Farrenkopf, Bethel, CT (US); Michael Quatannens, Chappaqua, NY (US)

(73) Assignee: FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 14/018,561

(22) Filed: Sep. 5, 2013

(65) Prior Publication Data

US 2015/0065331 A1    Mar. 5, 2015

(51) Int. Cl.
  *C04B 35/00*    (2006.01)
  *C04B 35/76*    (2006.01)

(52) U.S. Cl.
  CPC ..................................... *C04B 35/76* (2013.01)

(58) Field of Classification Search
  CPC .... C04B 35/111; C04B 35/14; C04B 35/115; C04B 35/62236; C04B 35/803; C04B 35/806
  USPC ......... 501/95.1, 95.2, 153, 154; 422/179, 221
  See application file for complete search history.

(56) References Cited

U.S. PATENT DOCUMENTS

| | | | | |
|---|---|---|---|---|
| 2,526,066 | A * | 10/1950 | Croce | 106/675 |
| 4,929,429 | A * | 5/1990 | Merry | 422/179 |
| 5,250,269 | A * | 10/1993 | Langer | 422/179 |
| 6,128,874 | A * | 10/2000 | Olson et al. | 52/232 |

| | | | |
|---|---|---|---|
| 2002/0095871 | A1 | 7/2002 | McArdle et al. |
| 2004/0234436 | A1 | 11/2004 | Howorth |
| 2011/0118102 | A1 | 5/2011 | Zoitos et al. |

OTHER PUBLICATIONS

Fiberfrax Specialties Product—Pumpable-LDS and Pumpable-GS from www.unifrax.com, dated Jun. 20, 2013.
Unifrax Safety Data Sheet—Fiberfrax LDS Moldable Ceramic Fiber Pumpable-LDS; LDS Moldable (Caulking Grade) from www.unifrax.com, dated Jun. 20, 2013.
Unifrax Product Information Sheet—Fiberfrax Specialties Products, 2009.
Unifrax Safety Data Sheet—Fiberfrax Pumpable GS Insulating Mix from www.unifrax.com, dated Jun. 20, 2013.
Brochure re MicroLite Vermiculite Dispersion, Grace Construction Products, 1999.
W.R. Grace Material Safety Data Sheet—Microlite Vermiculite Dispersions, dated Jun. 2, 2004.
Fiberfrax Specialties Products—LDS Moldable and LDS AL-Moldable from www.unifrax.com, dated Jun. 20, 2013.
Grace Constructions Products, About Us portion of website—www.na.graceconstruction.com, dated Jun. 20, 2013.
International Search Report and Written Opinion for PCT Application No. PCT/US2014/045020, dated Oct. 30, 2014, p. 1-10.

* cited by examiner

*Primary Examiner* — Noah Wiese
(74) *Attorney, Agent, or Firm* — MKG, LLC

(57) ABSTRACT

An expandable refractory for high temperature sealing, the expandable refractory includes un-expanded vermiculite and one or more mixtures of ceramic fibers in a water based refractory binder.

26 Claims, 10 Drawing Sheets
(8 of 10 Drawing Sheet(s) Filed in Color)

HIGH TEMPERATURE EXPANDABLE REFRACTORY

FIELD OF THE INVENTION

The present invention generally relates to an expandable refractory for high temperature applications and more specifically relates to an expandable refractory comprising un-expanded vermiculite and a mixture of ceramic fibers in a water based refractory binder, for use in fuel cell systems, as well as any type of application where a joint/seams needed repair.

BACKGROUND OF THE INVENTION

A fuel cell is a device which uses an electrochemical reaction to convert chemical energy stored in a fuel such as hydrogen or methane into electrical energy. In general, fuel cells include an anode to catalytically react with the fuel and a cathode in fluid communication with an oxidant such as air. The anode and cathode are disposed on opposing sides of an electrolyte material which conducts electrically charged ions therebetween. The electrolyte material and the design of the fuel cell determine the type and performance of the fuel cell. For example, Molten Carbonate Fuel Cells (MCFC) which operate at approximately 650° C. typically include an electrolyte which is a molten liquid during operation.

Fuel cells are typically arranged in a stacked relationship. A fuel cell stack includes many individual cells positioned between a fixed end plate and a free end plate. In some instances the fuel cell stack is contained within an enclosure such as a steel vessel. The enclosure typically includes penetrations extending therethrough. The penetrations are used for the passage of electrical conductors and pipes that provide communication between the fuel cell stack and a balance of plant system located outside of the enclosure. The enclosure defines an interior area that is typically subject to high temperatures and pressures and large temperature and pressure changes. The interior area is therefore sealed off from external areas. Thus, the penetrations have a refractory material therein to seal the penetrations.

The refractory materials have different coefficients of expansion than the materials they seal against, such as a metallic material. In addition, the refractory materials are generally applied at room temperature and are required to tolerate a transition to operation at high temperatures. Typically, the refractory material shrinks during heating, resulting in a loss of sealing at high operating temperatures.

SUMMARY OF THE INVENTION

The present invention resides in an expandable refractory for high temperature sealing, for example, for use in Molten Carbonate and/or Solid Oxide fuel cells. The expandable refractory includes un-expanded vermiculite and one or more mixtures of ceramic fibers in a water based refractory binder. In one embodiment, the un-expanded vermiculite is present at 5 vol. % to 25 vol. % and the mixture of ceramic fibers in the water based refractory binder is present at 75 vol. % to 95 vol. %.

The present invention also resides in a method of curing an expandable refractory. The method includes providing an expandable refractory comprising un-expanded vermiculite and at least one mixture of ceramic fibers in a water based refractory binder the un-expanded vermiculite is present at 5 vol. % to 25 vol. %; and the mixture of ceramic fibers in the water based refractory binder is present at 75 vol. % to 95 vol. %. The expandable refractory is heated to 1200° F., for example at a rate of 0.5 to 30° F. per minute.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1:
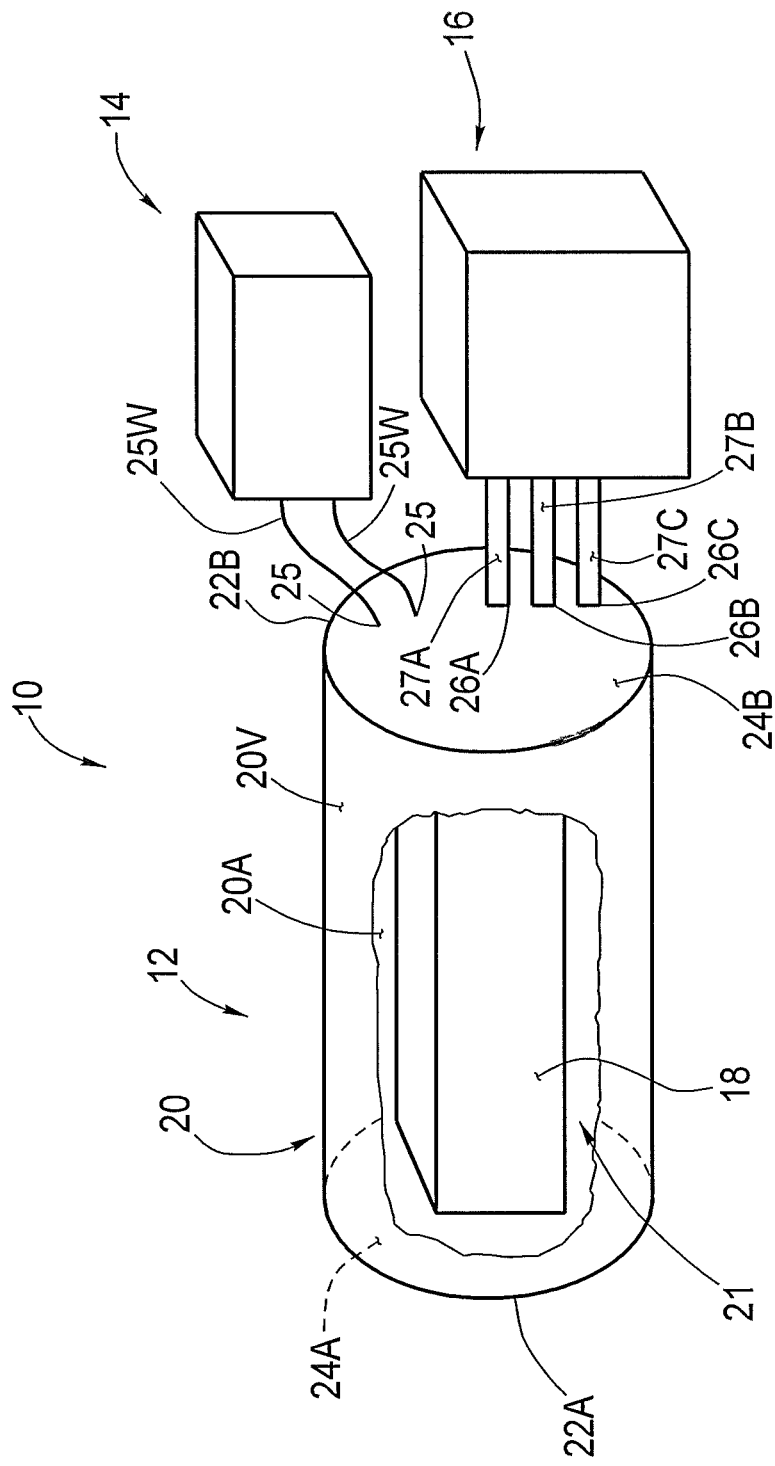
FIG. 1 is a schematic of a fuel cell power plant.

Referring to FIG. 1 a fuel cell power plant 10 is shown having a fuel cell module 12 in electrical communication with an electrical balance of plant module 14. The fuel cell module 12 is shown in fluid communication with a mechanical balance of plant module 16. The fuel cell module 12 has a fuel cell system 18 (e.g., one or more MCFCs, one or more solid oxide fuel cells, one or more phosphoric acid fuel cells and one or more of another type of fuel cell) positioned within an enclosure 20. The enclosure 20 is shown with a portion of thereof cut away for illustration of the fuel cell system 18. The enclosure 20 includes a hollow cylindrical vessel 20V illustrated with a portion thereof cut away to show the fuel cell system positioned therein. The vessel 20V has an interior surface 20A defining an opening 21 extending between a first end 22A and a second end 22B of the enclosure. The enclosure 20 includes circular end plates 24A, 24B removably and sealingly positioned on the first and second ends 22A, 22B, respectively. In one embodiment, the end plates 24A, 24B and the cylindrical vessel 20V are manufactured from a metal, for example steel.

While the enclosure 20 is described as being a hollow cylindrical vessel 20V and having circular end plates 24A, 24B, the present invention is not limited in this regard as enclosures and end plates of any shape, including but not limited to box shape enclosures and rectilinear end plates, can be employed without departing from the broader aspects of the present invention.

The electrical balance of plant module 14 includes electrical equipment (not shown) such as an inverter, power metering, switching equipment and a voltage transformer. The mechanical balance of plant module 16 includes equipment (not shown) needed to feed fuel, air and water to the fuel cell module 12, for preheating and humidifying the fuel and for receiving and treating exhaust fluids from the fuel cell module.

The end plate 24B is shown having two electrical penetrations 25 extending therethrough. Wiring 25W extends into the fuel cell module 12 through the electrical penetrations 25. The wiring 25W provides the electrical communication between the fuel cell module 12 and the electrical balance of plant module 14. The end plate 24B also has first through third penetrations 26A-26C extending therethrough. The first through third penetrations 26A-26C have respective conduits 27A, 27B and 27C positioned thereon and extending to the mechanical balance of plant module 16.

Figure 2:
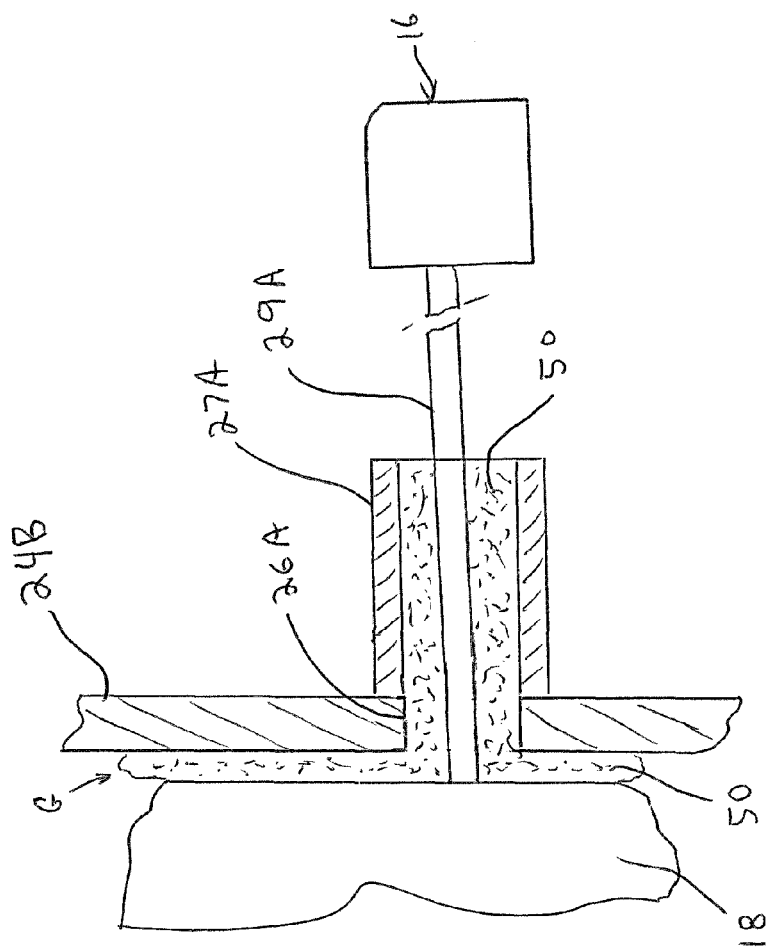
FIG. 2 is an enlarged cross sectional view of a portion of an endplate and penetration of an enclosure for a fuel cell stack of the fuel cell power plant of FIG. 1.

During operation, the fuel cell system 18 gives off heat, thereby raising the temperature of the interior area 21, the vessel 20V, the penetrations 25, 26A, 26B and 26C and the conduits 27A, 27B and 27C. As shown in FIG. 2, an expandable refractory 50 is positioned between the end plate 24B and the fuel cell system 18. The expandable refractory 50 is also disposed in the conduit 27A and around another conduit 29A extending from the balance of plant module 16, though the conduit 27A, into the interior area 21 and connecting to the fuel cell system 18. The expandable refractory 50 seals the conduit 27A and a gap G defined between the end plate 24B and the fuel cell system 18.

The expandable refractory 50 is formed from un-expanded vermiculite and a mixture of ceramic fibers in a water based refractory binder. The un-expanded vermiculite is a naturally occurring vermiculite that has water trapped therein. The action of heating causes the water to turn to steam and expand the vermiculite. This expansion action only occurs one time when the temperature of the material passes through 212° F. In one embodiment, expandable refractory 50 is formed from the un-expanded vermiculite and two mixtures of the ceramic fibers in the water based refractory binder. The mixture of the ceramic fibers in the water based refractory binder, include, but are not limited to, an LDS moldable mixture and a pumpable GS mixture, both available from Unifrax I LLC of Niagra Falls, N.Y. The LDS moldable mixture of the ceramic fibers in the water based refractory binder is moldable, namely a sticky putty having a wet density of about 85 pounds per cubic foot. The pumpable GS mixture of the ceramic fibers in the water based refractory binder is pumpable, namely a smooth putty having a wet density of about 70 pounds per cubic foot such that the pumpable GS mixture can be pumped through a tube, pipe and/or crevices in refractory. In one embodiment, the un-expanded vermiculite is an un-expanded vermiculite dispersion in water such as a Microlite® available from Grace Construction Products, W. R. Grace & Co. of Cambridge, Mass. While the expandable refractory 50 is described as being formed from the un-expanded vermiculite and one or two mixtures of the ceramic fibers in the water based refractory binder, the present invention is not limited in this regard as any number of mixtures of the ceramic fibers in the water based refractory binder, may be employed.

As described herein, the vol. % and wt. % of the un-expanded vermiculite and the mixture of ceramic fibers in a water based refractory binder is provided for the expandable refractory 50 in an as mixed state at room temperature, prior to curing or heating. The expandable refractory 50 expands after curing and heating. For example, after heating to 1200° F., the expandable refractory 50 expands to a volume of about 5 to 50% of the volume of the expandable refractory 50 in the as mixed state at room temperature, prior to curing or heating. In one embodiment, after heating to 1200° F., the expandable refractory 50 expands to a volume of about 40 to 50% of the volume of the expandable refractory 50 in the as mixed state at room temperature, prior to curing or heating. In one embodiment, after heating to 1200° F., the expandable refractory 50 expands to a volume of about 5 to 10% of the volume of the expandable refractory 50 in the as mixed state at room temperature, prior to curing or heating. The amount of expansion of the expandable refractory is dependent of the flexibility and size of a structure that the expanded refractory 50 is expanded in. The expandable refractory 50 has the un-expanded vermiculite present at 5 vol. % to 25 vol. % and the mixture of ceramic fibers in the water based refractory binder is present at 75 vol. % to 95 vol. %, based on a total volume of the expandable refractory 50.

In one embodiment, the expandable refractory has the un-expanded vermiculite present at 5 vol. % to 6 vol. % and the mixture of ceramic fibers in the water based refractory binder is present at 94 vol. % to 95 vol. %.

In one embodiment, the expandable refractory has the un-expanded vermiculite present at 24 vol. % to 26 vol. % and the mixture of ceramic fibers in the water based refractory binder is present at 73 vol. % to 76 vol. %.

In one embodiment, the expandable refractory has the un-expanded vermiculite present at 19 vol. % to 21 vol. % and the mixture of ceramic fibers in the water based refractory binder is present at 79 vol. % to 81 vol. %.

In one embodiment, the expandable refractory has the un-expanded vermiculite present at 12 vol. % to 13 vol. % and the mixture of ceramic fibers in the water based refractory binder is present at 87 vol. % to 88 vol. %.

In one embodiment, the expandable refractory has the un-expanded vermiculite present at 4 wt. % to 6 wt. % and the mixture of ceramic fibers in the water based refractory binder is present at 94 wt. % to 96 wt. %, based on a total weight of the expandable refractory 50.

There is disclosed herein a method of curing the expandable refractory 50. The method includes providing an expandable refractory 50 comprising un-expanded vermiculite and one or more mixtures of ceramic fibers in a water based refractory binder. The un-expanded vermiculite is present at 5 vol. % to 25 vol. %; and the mixture of ceramic fibers in the water based refractory binder is present at 75 vol. % to 95 vol. %. The expandable refractory 50 is heated to 1200° F. In one embodiment, the expandable refractory 50 is maintained at the 1200° F. for at least two hours. In one embodiment, the expandable refractory 50 is held at a temperature of about 195° F. to about 220° F. for about one hour prior to the heating the expandable refractory 50 to the 1200° F. In one embodiment, the expandable refractory 50 is heated to the 1200° F. at a rate of about 0.5° F. per minute to about 20° F. per minute. In one embodiment, the expandable refractory 50 is heated to the 1200° F. at a rate of about 1° F. per minute. In one embodiment, the expandable refractory 50 is heated to the 1200° F. at a rate of about 3° F. per minute. In one embodiment, the expandable refractory 50 is heated to the 1200° F. at a rate of about 5° F. per minute. In one embodiment, the expandable refractory 50 is heated to the 1200° F. at a rate of about 15° F. per minute. In one embodiment, the expandable refractory 50 is heated to the 1200° F. at a rate of about 15° F. per hour to about 30° F. per hour. While the expandable refractory 50 is described as being heated to the 1200° F., the present invention is not limited in this regard as the expandable refractory 50 may be heated to temperatures greater than or less than 1200° F. Based on experimentation and testing, the inventors have found that the heating rate (e.g., heating to 220° F.) and hold time at 220° F. is dependent of thickness of the samples of the expandable refractory 50. For example, thicker samples of the expandable refractory 50 required lesser heat-up rates and longer hold times at 220° F. than comparable thinner samples.

Seven examples of compositions of the expandable refractory 50 disclosed herein are detailed below, with reference to FIGS. 3-10. The magnitudes for vol. % and wt. % for the components of the expandable refractories 50 of Examples 1-7 are provided before curing or heating.

Example 1

The expandable refractory 50 of Example 1 includes 5.9 vol. % un-expanded vermiculite and 94.1% of a mixture of ceramic fibers in a water based refractory binder. The mixture of ceramic fibers in a water based refractory binder consisted of 1 cup of Unifrax moldable LDS, available from Unifrax I LLC of Niagra Falls, N.Y. for every 1 tablespoon of un-expanded vermiculite Before heat treatment the expandable refractory 50 was moldable pasty and packable. After heating and expansion the expandable refractory 50 adhered well to the sample structure.

Example 2

Figure 3:
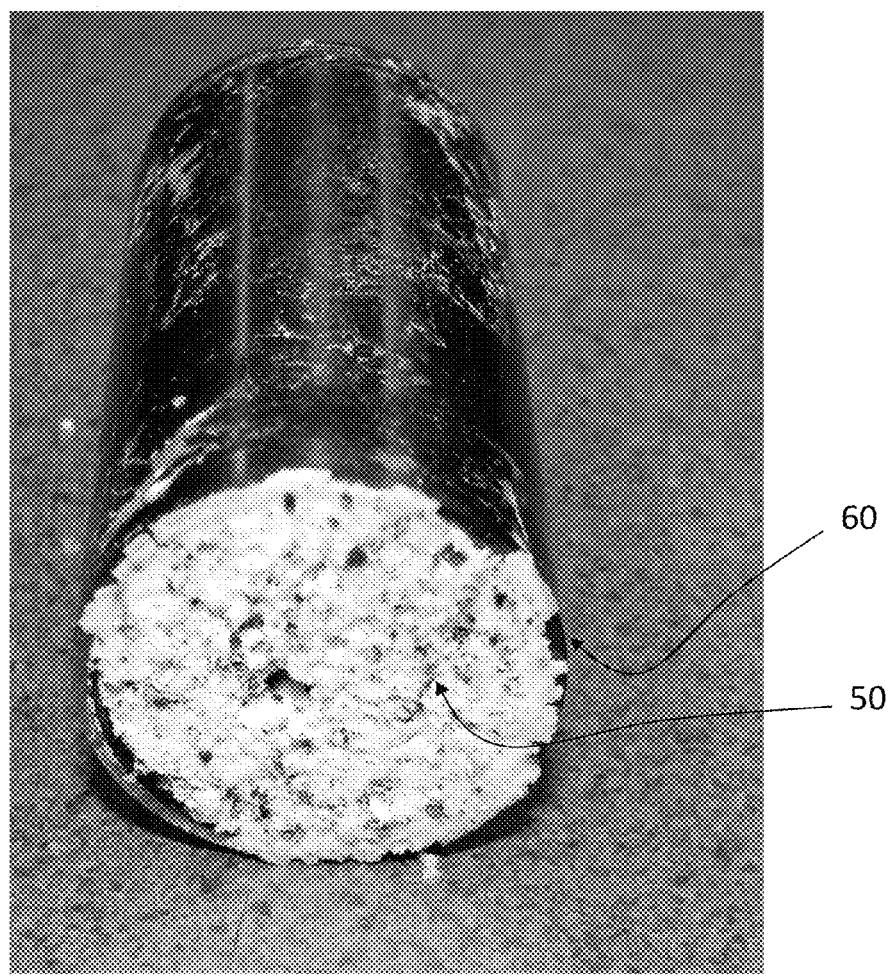
FIG. 3 is a photograph of an expandable refractory of the present invention disposed in a pipe, after heating.

The expandable refractory 50 of Example 2 includes 25 vol. % un-expanded vermiculite and 75 vol. % of a mixture of ceramic fibers in a water based refractory binder. The mixture of ceramic fibers in a water based refractory binder consisted of Unifrax moldables LDS, available from Unifrax I LLC of Niagra Falls, N.Y. Referring to FIG. 3 the expandable refractory 50 of Example 2 is shown after curing by heating to 1200° F. in a pipe 60. The expandable refractory 50 of Example 2 adhered to inside walls defined by the pipe 60. After the heating, the expandable refractory 50 expanded about 8% compared to prior heating.

Example 3

Figure 4:
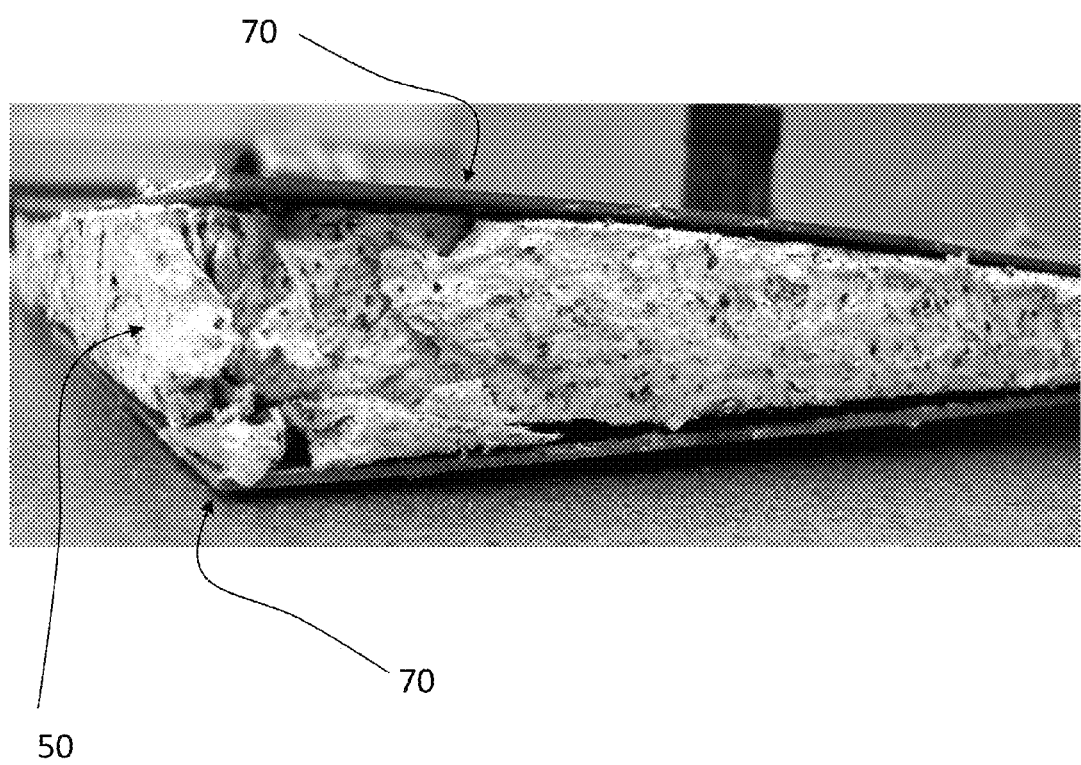
FIG. 4 is a photograph of an expandable refractory of the present invention disposed in between two plates, after heating.

The expandable refractory 50 of Example 3 includes 5.2 wt. % un-expanded vermiculite, 9.2 wt. % un-expanded vermiculite dispersion in water (i.e., Microlite® available from Grace Construction Products, W. R. Grace & Co. of Cambridge Mass.) and 85.7 wt. % of a mixture of ceramic fibers in a water based refractory binder. The mixture of ceramic fibers in a water based refractory binder consisted of 0.432 kg Unifrax pumpable GS, available from Unifrax I LLC of Niagra Falls, N.Y., for every 0.026 kg of un-expanded vermiculite. The expandable refractory 50 consisted of 0.046 kg of Microlite®, for every 0.026 kg in un-expanded vermiculite. Referring to FIG. 4 the expandable refractory 50 of Example 3 is shown after curing by heating to 198° F. for about eight hours following by increased heating at 15° F. per minute to 1200° F. between two plates 70. The expandable refractory 50 of Example 3 expanded between and adhered to inside walls defined by the plates 70. After the heating, the expandable refractory 50 expanded about 50 to 51% compared to prior to heating. Based on a comparison of Example 3 with other examples, the inventors found that suitable results can be achieved without the use of the Microlite®.

Example 4

Figure 5:
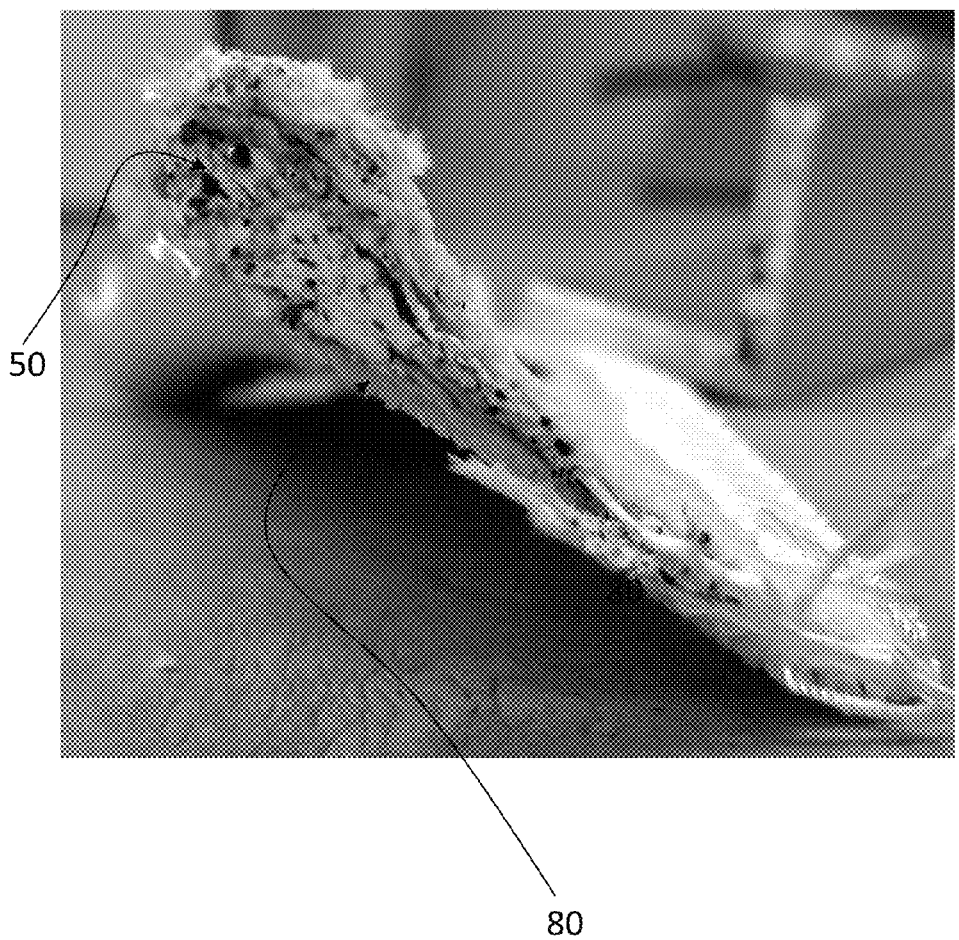
FIG. 5 is a photograph of an expandable refractory of the present invention disposed in a ceramic fabric, after heating.

The expandable refractory 50 of Example 4 includes 20 vol. % un-expanded vermiculite and 80 vol. % of a mixture of ceramic fibers in a water based refractory binder. The mixture of ceramic fibers in a water based refractory binder consisted of 20 vol. % (i.e., 1 teaspoon) Unifrax moldable LDS and 60 vol. % (i.e., 1 tablespoon) Unifrax pumpable GS, available from Unifrax I LLC of Niagra Falls, N.Y., for every teaspoon of un-expanded vermiculite. Referring to FIG. 5 the expandable refractory 50 of Example 4 is shown after curing by heating at a rate of 30° F. per hour to 225° F. followed by increased heating at a rate of 15° F. per hour to 1200° F. in a ceramic fiber fabric 80. The expandable refractory 50 of Example 4 adhered to inside walls defined by the fabric 80. After the heating, the expandable refractory 50 expanded about 8% compared to prior to heating.

Example 5

Figure 6:
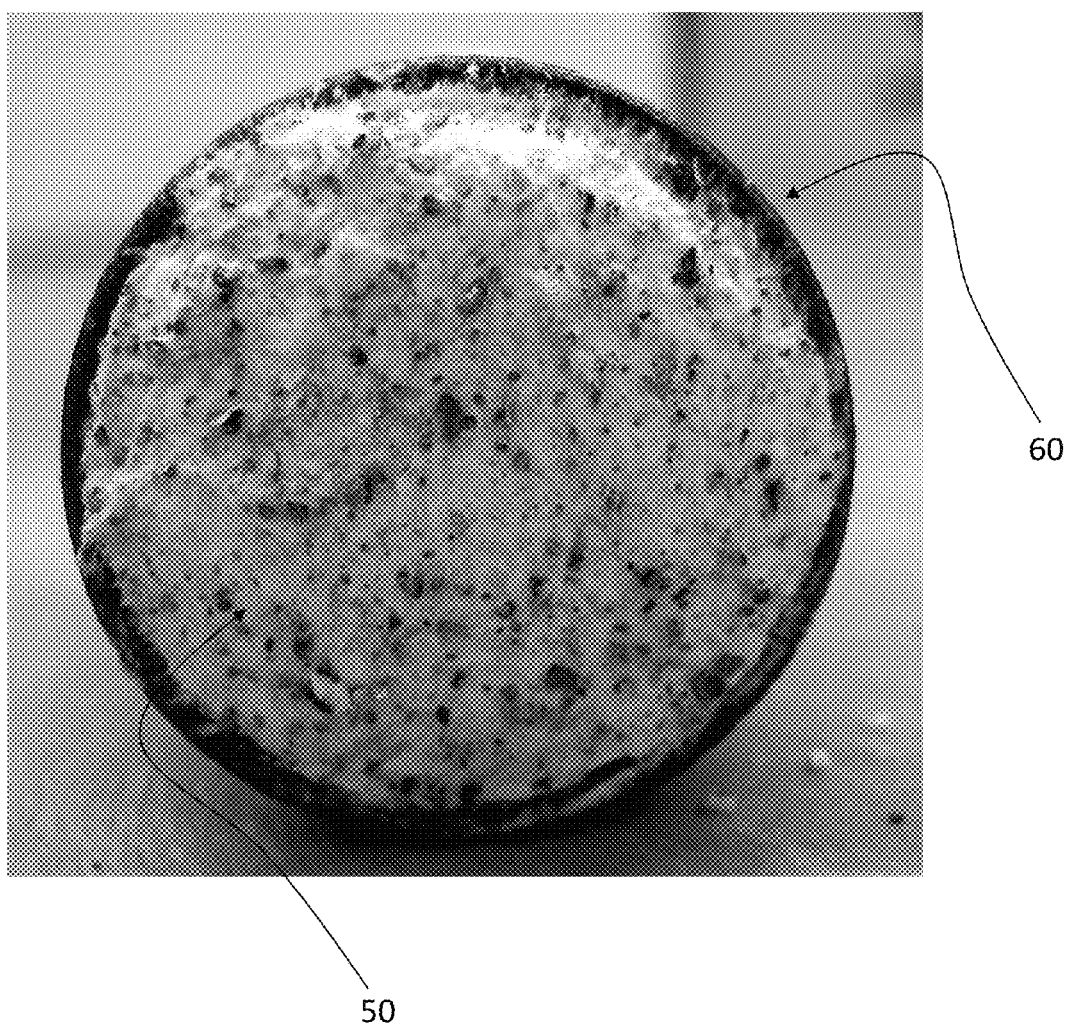
FIG. 6 is a photograph of an expandable refractory of the present invention disposed in a pipe, after heating.
Figure 7:
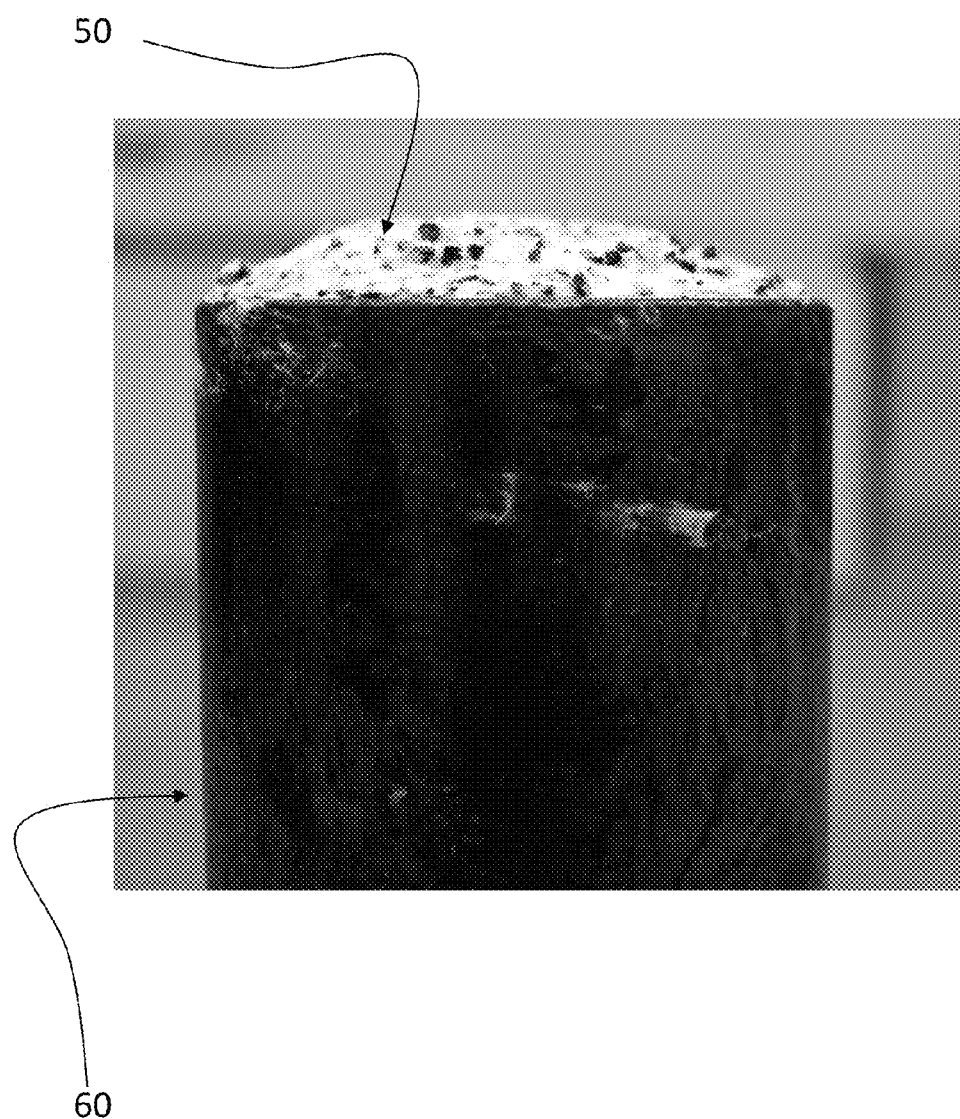
FIG. 7 is a photograph of an expandable refractory of the present invention disposed in a pipe, after heating.

The expandable refractory 50 of Example 5 includes 11.1 vol. % un-expanded vermiculite and 88.9 vol. % of a mixture of ceramic fibers in a water based refractory binder. The mixture of ceramic fibers in a water based refractory binder consisted of 22.2 vol. % (i.e., 1 teaspoon) Unifrax moldable LDS and 66.7 vol. % (i.e., 1 tablespoon) Unifrax pumpable GS, available from Unifrax I LLC of Niagra Falls, N.Y., for every ½ tablespoon of un-expanded vermiculite. Referring to FIGS. 6 and 7 the expandable refractory 50 of Example 5 is shown after curing by heating at a rate of 0.5° F. per minute to 1200° F. in a pipe 60. The expanded refractory 50 of Example 5 adhered to inside walls defined by the pipe 60, was in a semi-rigid form and expanded axially out of the pipe 60.

Example 6

Figure 8:
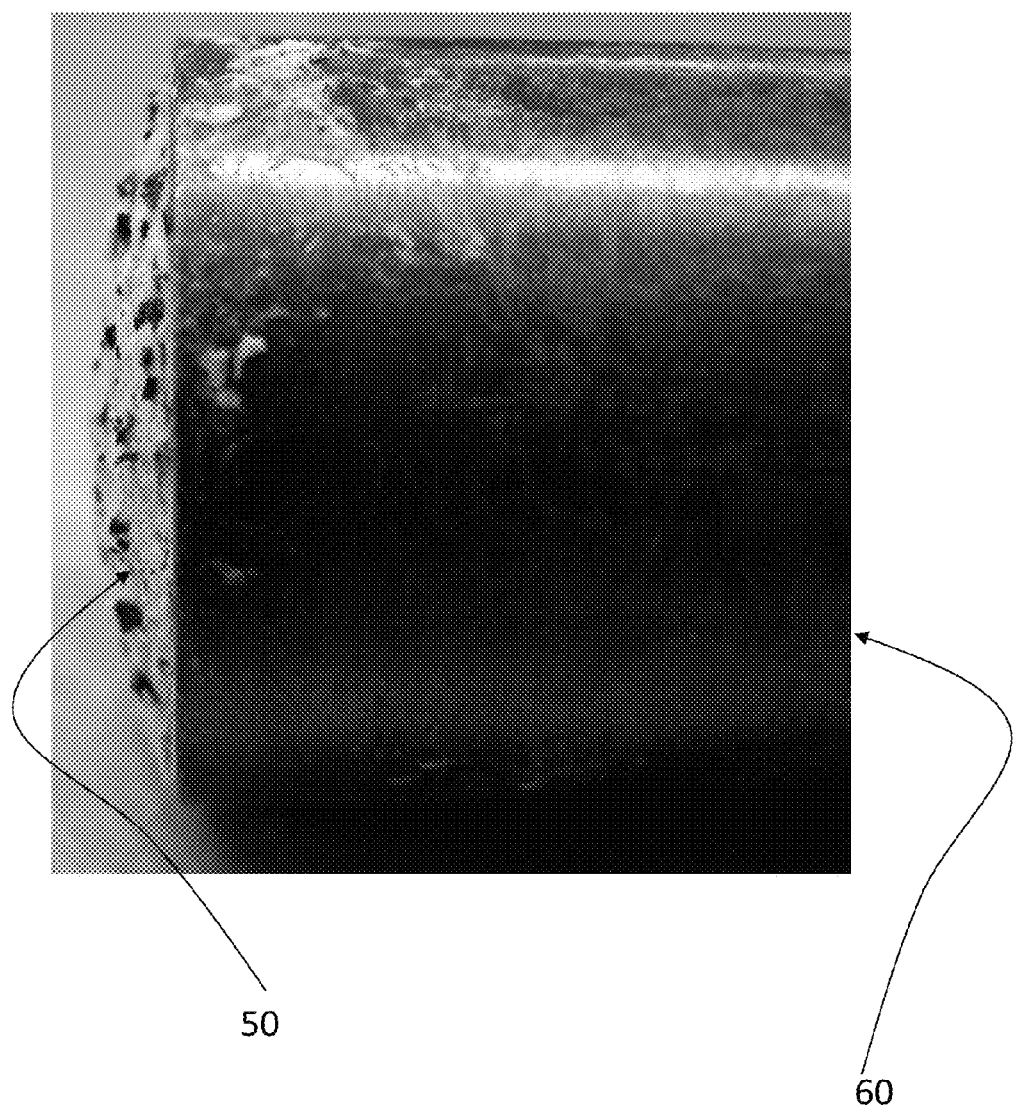
FIG. 8 is a photograph of an expandable refractory of the present invention disposed in a pipe, after heating.

The expandable refractory 50 of Example 6 includes 12.5 vol. % un-expanded vermiculite and 87.5 vol. % of a mixture of ceramic fibers in a water based refractory binder. The mixture of ceramic fibers in a water based refractory binder consisted of 12.5 vol. % (i.e., ½ teaspoon) Unifrax moldable LDS and 75 vol. % (i.e., 1 tablespoon) Unifrax pumpable GS, available from Unifrax I LLC of Niagra Falls, N.Y., for every ½ teaspoon of un-expanded vermiculite. Referring to FIG. 8 the expandable refractory 50 of Example 6 is shown after curing by heating at a rate of 1° F. per minute to 1200° F. in a pipe 60. The expanded refractory 50 of Example 5 adhered to inside walls defined by the pipe 60, held together and expanded axially out of the pipe 60.

Example 7

Figure 9:
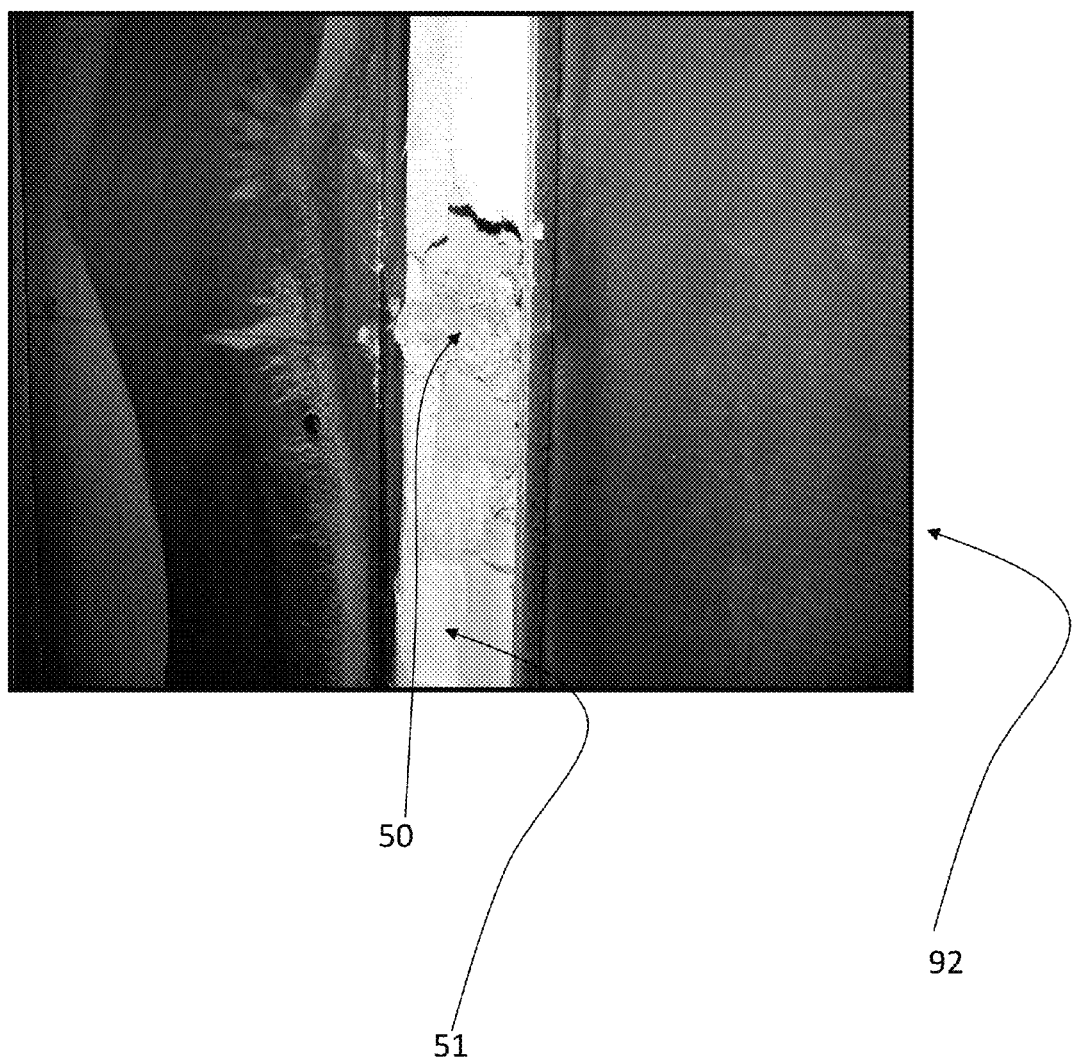
FIG. 9 is a photograph of a portion of an end plate of a fuel cell system with the expandable refractory of the present invention disposed in a pre-existing refractory, after heating.
Figure 10:
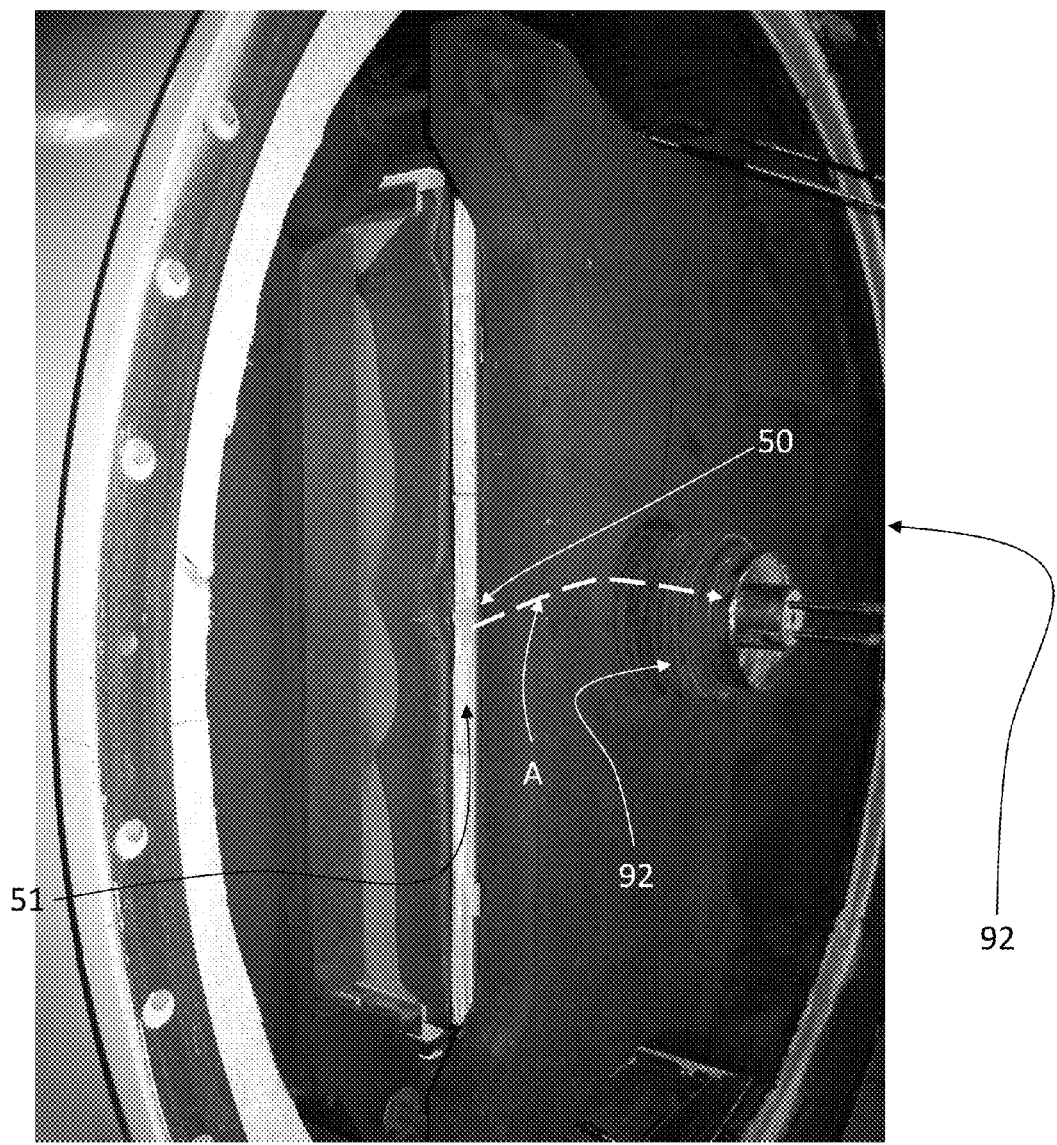
FIG. 10 is a photograph of a portion of the end plate of the fuel cell system of FIG. 9 with the expandable refractory of the present invention disposed in a pipe extending from the end plate, after heating.

The expandable refractory 50 of Example 7 includes 5.9 vol. % un-expanded vermiculite and 94.1 vol. % of a mixture of ceramic fibers in a water based refractory binder. The mixture of ceramic fibers in a water based refractory binder consisted of 94.1 vol. % (i.e. 1 cup) Unifrax moldable LDS, available from Unifrax I LLC of Niagra Falls, N.Y., for every tablespoon of un-expanded vermiculite. Referring to FIGS. 9 and 10 the expandable refractory 50 of Example 7 is shown after curing to 1200° F. in a crevice formed in a pre-existing refractory 51 (e.g., load bearing insulation) disposed in an end plate 92 and pipe 60 secured to the end plate 92. The crevice extends from a surface of the pre-existing refractory and into the pipe 60 as indicated by the arrow A. The expandable refractory 50 of Example 7 was pumped through the crevice before curing. After heating, the expandable refractory 50 adhered to inside walls defined by the pre-existing refractory 51.

Although the present invention has been disclosed and described with reference to certain embodiments thereof, it should be noted that other variations and modifications may be made, and it is intended that the following claims cover the variations and modifications within the true scope of the invention.

What is claimed is:

1. An expandable refractory for high temperature sealing, the expandable refractory comprising:
   un-expanded vermiculite; and
   at least one mixture of ceramic fibers in a water based refractory binder;
   the expandable refractory is configured for sealing by having a first volume prior to heating the expandable refractory and the expandable refractory having a second volume after the heating, the second volume being greater than the first volume.

2. The expandable refractory of claim 1, wherein:
   the un-expanded vermiculite is present at 5 vol. % to 25 vol. %; and
   the mixture of ceramic fibers in the water based refractory binder is present at 75 vol. % to 95 vol. %.

3. The expandable refractory of claim 1, wherein:
   the un-expanded vermiculite is present at 5 vol. % to 6 vol. %; and
   the mixture of ceramic fibers in the water based refractory binder is present at 94 vol. % to 95 vol. %.

4. The expandable refractory of claim 1, wherein:
   the un-expanded vermiculite is present at 24 vol. % to 26 vol. %; and
   the mixture of ceramic fibers in the water based refractory binder is present at 73 vol. % to 76 vol. %.

5. The expandable refractory of claim 1, wherein:
   the un-expanded vermiculite is present at 19 vol. % to 21 vol. %; and
   the mixture of ceramic fibers in the water based refractory binder is present at 79 vol. % to 81 vol. %.

6. The expandable refractory of claim 1, wherein:
   the un-expanded vermiculite is present at 12 vol. % to 13 vol. %; and
   the mixture of ceramic fibers in the water based refractory binder is present at 87 vol. % to 88 vol. %.

7. The expandable refractory of claim 1, wherein:
   the un-expanded vermiculite is present at 4 wt. % to 6 wt. %; and
   the mixture of ceramic fibers in the water based refractory binder is present at 94 wt. % to 96 wt. %.

8. The expandable refractory of claim 1, wherein the at least one mixture of ceramic fibers in a water based refractory binder is pumpable.

9. The expandable refractory of claim 1, wherein the at least one mixture of ceramic fibers in a water based refractory binder is moldable.

10. A method of curing an expandable refractory, the method comprising:
    providing an expandable refractory comprising un-expanded vermiculite and at least one mixture of ceramic fibers in a water based refractory binder the un-expanded vermiculite is present at 5 vol. % to 25 vol. %; and the mixture of ceramic fibers in the water based refractory binder is present at 75 vol. % to 95 vol. %;
    heating the expandable refractory to 1200° F.; and
    wherein the expandable refractory is maintained at the 1200° F. for at least two hours.

11. A method of curing an expandable refractory, the method comprising:
    providing an expandable refractory comprising un-expanded vermiculite and at least one mixture of ceramic fibers in a water based refractory binder the un-expanded vermiculite is present at 5 vol. % to 25 vol. %; and the mixture of ceramic fibers in the water based refractory binder is present at 75 vol. % to 95 vol. %;
    heating the expandable refractory to 1200° F.; and
    wherein the expandable refractory is held at a temperature of about 195° F. to about 220° F. for about one hour prior to the heating the expandable refractory to the 1200° F.

12. A method of curing an expandable refractory, the method comprising:
    providing an expandable refractory comprising un-expanded vermiculite and at least one mixture of ceramic fibers in a water based refractory binder the un-expanded vermiculite is present at 5 vol. % to 25 vol. %; and the mixture of ceramic fibers in the water based refractory binder is present at 75 vol. % to 95 vol. %;
    heating the expandable refractory to 1200° F.; and
    wherein the expandable refractory is heated to the 1200° F. at a rate of about 0.5° F. per minute to about 20° F. per minute.

13. A method of curing an expandable refractory, the method comprising:
    providing an expandable refractory comprising un-expanded vermiculite and at least one mixture of ceramic fibers in a water based refractory binder the un-expanded vermiculite is present at 5 vol. % to 25 vol. %; and the mixture of ceramic fibers in the water based refractory binder is present at 75 vol. % to 95 vol. %;
    heating the expandable refractory to 1200° F.; and
    wherein the expandable refractory is heated to the 1200° F. at a rate of about 15° F. per hour to about 30° F. per hour.

14. The expandable refractory of claim 1, wherein the second volume is 5 to 50 percent greater than the first volume.

15. . The expandable refractory of claim 1, wherein the second volume is 40 to 50 percent greater than the first volume.

16. The expandable refractory of claim 1, wherein the second volume is 5 to 10 percent greater than the first volume.

17. The expandable refractory of claim 1, wherein the heating comprises heating to 1200° F.

18. The expandable refractory of claim 1, wherein expansion of the expandable refractory from the first volume to the second volume occurs one time when the heating is at a temperature of 212° F.

19. A fuel cell power plant comprising:
    a fuel cell module comprising an enclosure having at least one fuel cell system disposed therein;
    a gap defined between the at least one fuel cell system and the enclosure; and
    an expandable refractory expanded in the gap by a one-time heating, the expandable refractory comprising:
       un-expanded vermiculite; and
       at least one mixture of ceramic fibers in a water based refractory binder; and
       the expandable refractory having a first volume prior to the heating the expandable refractory and the expandable refractory having a second volume after the heating, the second volume being greater than the first volume and filling the gap.

20. The fuel cell power plant of claim 19, wherein the expandable refractory is adhered to the enclosure and the fuel cell system.

21. The fuel cell power plant of claim 19, wherein the expandable refractory comprises a seal that seals the gap.

22. The fuel cell power plant of claim 19, further comprising a second refractory having at least one crevice formed therein, said crevice having the expandable refractory pumped therein, the expandable refractory being expanded in and sealing the crevice.

23. A fuel cell power plant comprising:
- a fuel cell module comprising an enclosure having at least one fuel cell system disposed therein;
- at least one penetration extending through the enclosure; and
- an expandable refractory expanded in the at least one penetration by a one-time heating, the expandable refractory comprising:
  - un-expanded vermiculite; and
  - at least one mixture of ceramic fibers in a water based refractory binder; and
  - the expandable refractory having a first volume prior to the heating the expandable refractory and the expandable refractory having a second volume after the heating, the second volume being greater than the first volume and filling the at least one penetration.

24. The fuel cell power plant of claim 23, wherein the expandable refractory is adhered to the enclosure and the at least one penetration.

25. The fuel cell power plant of claim 23, wherein the expandable refractory comprises a seal that seals the penetration.

26. The fuel cell power plant of claim 23, further comprising a second refractory having at least one crevice formed therein, said crevice having the expandable refractory pumped therein, the expandable refractory being expanded in and sealing the crevice.

* * * * *